P. P. CRABILL AND J. TURNER.
BUMPER FOR AUTOMOBILES.
APPLICATION FILED FEB. 3, 1921.

1,402,399. Patented Jan. 3, 1922.

Inventors
Pearl P. Crabill and
James Turner
By Thurman Bowman
Attorneys

UNITED STATES PATENT OFFICE.

PEARL P. CRABILL AND JAMES TURNER, OF SPRINGFIELD, OHIO.

BUMPER FOR AUTOMOBILES.

1,402,399.  Specification of Letters Patent.  Patented Jan. 3, 1922.

Application filed February 3, 1921. Serial No. 442,242.

*To all whom it may concern:*

Be it known that we, PEARL P. CRABILL and JAMES TURNER, citizens of the United States, residing at Springfield, in the county of Clark and State of Ohio, have invented certain new and useful Improvements in Bumpers for Automobiles, of which the following is a specification.

Our invention relates to improvements in bumpers for automobiles, it more particularly relating to the means for attaching the bumpers to the frames of the machines.

The object of our invention is to provide simple and effective devices for securely attaching a bumper to the frame of an automobile without the necessity of altering the frame; a further object being to provide securing devices which are universal in character in that they are applicable to both the rigid type of bumper and the spring bar and arm type, and are also capable of being readily attached to the majority of channel bar frames.

Figure 1:
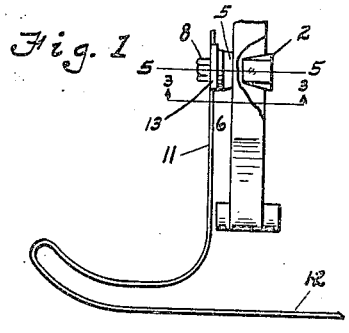
Fig. 1 is a top plan view of a portion of the frame partly broken away showing a part of a bumper of the spring type attached thereto by our improved device.

Referring to the drawings, 1 represents the vehicle frame, which is of the usual channel form. A clamping member 2 is provided with a recess, the upper wall $2^a$ of which has a pair of finished faces 3 which may be fitted to the upper side of the lower flange $1^a$ of the frame. The lower wall of the recess, which is in two parts $2^a$, has finished faces 4, formed at a inclination to the faces 3.

A second clamping member is shown at 5, the upper surface of which is formed with a straight face $5^a$ and the lower surface with an inclined face $5^b$. This member, which is in the nature of a wedge, is inserted between the lower face of the frame flange $1^a$ and the inclined faces 4 of the clamping member 2, with the straight face $5^a$ adjacent the flange and the inclined face $5^b$ co-operating with the inclined faces 4.

The wedge 5 has at the outer end thereof an integral disk 6 whose outer face is formed with serrations and to this serrated disk is clamped one of the arms of the bumper by the bolt 7, the head $7^a$ of which occupies a recess $7^b$ in the inner end of the clamping member 2, and whose end is threaded to receive a nut 8. The bolt passes through a perforation 9 in the member 2 and between the lower wall portions $2^b$ thereof, and through a perforation 10 in the wedge disk, the walls of the wedge portion being cut away, as indicated at $5^c$, to accommodate the bolt. It will be noticed that this recess $5^c$ extends into the bottom of the wedge, so that the bolt is allowed to project through the wedge and between the walls $2^a$ of the member 2, on a line which intersects the plane of those portions of the inclined surfaces $5^b$, which contact the faces 4, whereby the points of contact will lie within the transverse plane of the bolt, so that, when the bolt is tightened, the points of resistance are in planes substantially parallel to the longitudinal axis of the bolt. This construction further results in permitting the wedge to be of minimum thickness, thus resulting in a considerable saving in material.

In the form of bumper shown in Fig. 1, in which the arm 11 is shown of spring material integrally formed with the bar 12, there is preferably employed a plate 13 of cast metal, the inner face of which is serrated and the outer face formed with top and bottom flanges $13^a$ to enclose the edges of the arm 11, the plate being perforated to receive the bolt and being inserted between the arm and the disk 6 with its serrations engaging the serrations of the disk. A spring 14 is preferably inserted between the nut 8 and the arm 11. When the nut is tightened the wedge 5 will be forced firmly between the flange $1^a$ and the walls $2^b$ to cause the flange $1^a$ of the frame to be securely clamped between the wedge and wall $2^a$, while the plate 13 and disk 6 will also be securely held together.

Figure 2:
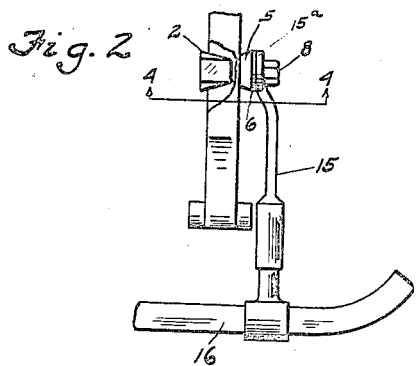
Fig. 2 is also a top plan view of a similar nature, but showing a bumper of the rigid type.
Figure 3:
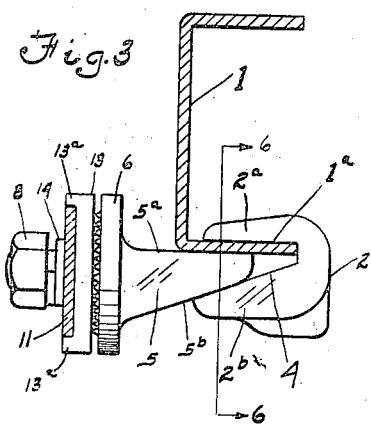
Fig. 3 is an enlarged section on the line 3—3 of Fig. 1.
Figure 4:
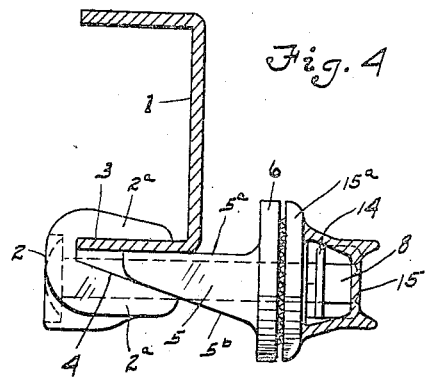
Fig. 4 is an enlarged section on the line 4—4 of Fig. 2.
Figure 5:
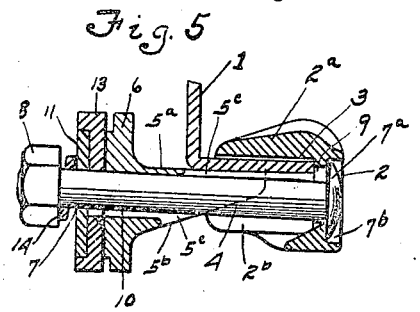
Fig. 5 is an enlarged section on the line 5—5 of Fig. 1.
Figure 6:
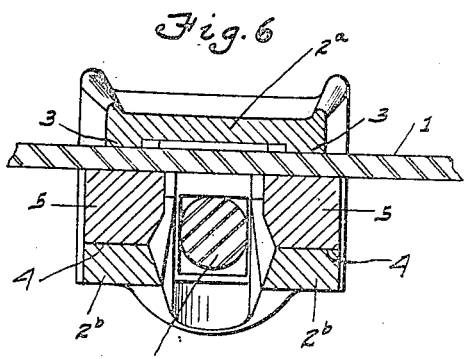
Fig. 6 is a section on a larger scale on the line 6—6 of Fig. 3.
Figure 7:
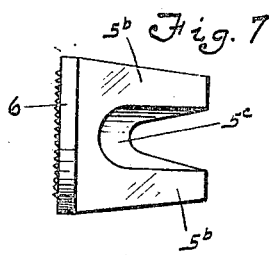
Fig. 7 is a bottom plan of the wedge.
Figure 8:
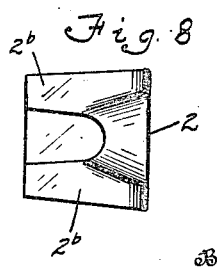
Fig. 8 is a bottom plan of the clamping member.

In the form of bumper shown in Fig. 2, the arm 15 is of the rigid type, preferably cast metal, to which the bar 16 is yieldably secured in a well known manner. In this case, the rear end of the arm is formed with a perforated disk-like portion 15$^a$, the inner face of which is serrated to co-operate with the serrations of the disk 6, thus enabling us to dispense with the plate 13.

Having thus described our invention, we claim:—

1. In a structure of the character described, a member recessed to receive a frame flange and having an inclined wall, a wedge in said recess between said flange and inclined wall, a buffer bar arm, and a bolt extending through said parts to clamp the same together, said bolt intersecting the planes of the contacting surfaces of said inclined wall and wedge.

2. In a structure of the character described, a member recessed to receive a frame flange having an inclined wall, a wedge arranged between the flange and inclined wall, a buffer bar arm, a loose plate between the arm and wedge together with means thereon to hold the arm in alignment therewith, interengaging parts between adjacent faces of said wedge and plate, and means for clamping the parts together.

3. In a structure of the character described, a member recessed to receive a frame flange, a wedge in the recess of said member between one wall of the recess and the flange, a buffer bar arm, said wedge having a serrated face, a part associated with said arm also having a serrated face, and devices for drawing the wedge and recessed member together to clamp the frame and also to clamp said serrated faces together.

4. In a structure of the character described, a member recessed to receive a frame flange, a wedge arranged between one wall of the recess and said flange, a buffer bar arm, said wedge having a serrated face, a plate having flanges on one side thereof, to receive said arm and a serrated face on the opposite side thereof, and devices for forcing said wedge into said recess to clamp the flange of the frame and also for clamping the arm plate and wedge together with the serrated faces in juxtaposition.

5. In a structure of the character described, a member recessed to receive a frame flange and having an inclined wall, a wedge in said recess between said flange and inclined wall, a buffer bar arm, and a bolt extending through said parts to clamp the same together, said wedge having a channel to receive said bolt which opens into the bottom surface thereof, whereby the bolt intersects the planes of the contacting surfaces of said inclined wall and wedge.

In testimony whereof, we have hereunto set our hands this 22nd day of January, 1921.

PEARL P. CRABILL.
JAMES TURNER.

Witness:
CHAS. I. WELCH.